US012304777B2

(12) United States Patent
Bumann et al.

(10) Patent No.: US 12,304,777 B2
(45) Date of Patent: May 20, 2025

(54) SLIDING GUIDE SHOE FOR AN ELEVATOR

(71) Applicant: Inventio AG, Hergiswil (CH)

(72) Inventors: Patrick Bumann, Eschenbach (CH); Volker Zapf, Kriens-Obernau (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/907,284

(22) PCT Filed: Mar. 26, 2021

(86) PCT No.: PCT/EP2021/057980
§ 371 (c)(1),
(2) Date: Sep. 26, 2022

(87) PCT Pub. No.: WO2021/198092
PCT Pub. Date: Oct. 7, 2021

(65) Prior Publication Data

US 2023/0113353 A1 Apr. 13, 2023

(30) Foreign Application Priority Data

Mar. 31, 2020 (EP) .................................... 20167249

(51) Int. Cl.
*B66B 7/04* (2006.01)

(52) U.S. Cl.
CPC .................................... *B66B 7/047* (2013.01)

(58) Field of Classification Search
CPC ........... B66B 7/047; B66B 7/04; B66B 7/048; Y10T 403/7064; Y10T 403/7051
See application file for complete search history.

(56) References Cited

U.S. PATENT DOCUMENTS 3,596,940 A * 8/1971 Horwitt ................. F16B 21/073 403/368
4,271,932 A * 6/1981 Klein ...................... B66B 7/047 187/409
4,598,798 A * 7/1986 Koppensteiner ........ B66B 7/047 187/409
4,716,991 A 1/1988 Riechers
2006/0275076 A1* 12/2006 Hanrahan ............. F16D 1/0835 403/365
(Continued)

FOREIGN PATENT DOCUMENTS

CN 86104695 A * 4/1987 ............. B66B 7/047
CN 103958386 A 7/2014
(Continued)

OTHER PUBLICATIONS

Machine translation of DE 202007012729 U1 (Year: 2009).*
Machine translation of CN 107187992 A (Hu et al.) (Year: 2017).*

*Primary Examiner* — Minh Truong
*Assistant Examiner* — Michelle M Mudwilder
(74) *Attorney, Agent, or Firm* — William J. Clemens; Shumaker, Loop & Kendrick, LLP

(57) ABSTRACT

A sliding guide shoe for an elevator has a guide shoe housing and an insert inserted into the guide shoe housing for guiding an elevator car or a counterweight. In order to positionally secure the insert, the insert has profiled pins that engage in bores in the guide shoe housing. In order to form the profiling, the pins each have radially outwardly directed ribs or projections that are distributed evenly over the circumference.

13 Claims, 2 Drawing Sheets

(56) References Cited

U.S. PATENT DOCUMENTS

| | | | | |
|---|---|---|---|---|
| 2008/0017457 | A1 * | 1/2008 | Ach | B66B 7/047 29/700 |
| 2009/0114057 | A1 * | 5/2009 | Fukui | B62K 23/06 74/551.8 |
| 2014/0205374 | A1 * | 7/2014 | Nias | F16D 9/06 403/367 |
| 2017/0362058 | A1 * | 12/2017 | Purohit | B66B 7/047 |
| 2022/0363514 | A1 * | 11/2022 | Russwurm | B66B 5/18 |

FOREIGN PATENT DOCUMENTS

| | | | | | |
|---|---|---|---|---|---|
| CN | 103998364 | A | | 8/2014 | |
| CN | 104355204 | A | * | 2/2015 | B66B 7/047 |
| CN | 107187992 | A | * | 9/2017 | B66B 7/023 |
| CN | 107207206 | A | | 9/2017 | |
| CN | 210176259 | U | | 3/2020 | |
| DE | 20315915 | U1 | | 3/2005 | |
| DE | 202006004593 | U1 | | 8/2007 | |
| DE | 202007012728 | U1 | | 2/2009 | |
| DE | 202007012729 | U1 | * | 3/2009 | B66B 7/047 |
| JP | S6256580 | U | | 4/1987 | |
| JP | S62100388 | A | | 5/1987 | |
| JP | 2007326691 | A | | 12/2007 | |

* cited by examiner

SLIDING GUIDE SHOE FOR AN ELEVATOR

FIELD

The invention relates to a sliding guide shoe for an elevator for transporting people or goods.

BACKGROUND

Sliding guide shoes are often used to guide elevator cars. Elevator installations in buildings generally have a vertical elevator shaft in which a guide rail is arranged on mutually opposing shaft walls in each case. Sliding guide shoes arranged on the elevator car have sliding surfaces facing the guide rail, which slide along the guide rail with little play. Known and used are sliding guide shoes that have inserts with sliding surfaces, the inserts often being designed as U-shaped profiles in cross-section.

Irregularities (such as rail joints) caused by producing and by assembling the guide rails in the elevator shaft can result in these being transferred to the counterweight and the elevator car during travel, where they cause undesirable vibrations. This effect impairs the elevator system and has a particularly negative effect on travel comfort. Rail joints are non-homogeneous transitions at the beginning and end of the guide rails. Rail joints are particularly problematic in the case of guide rails bent from metal sheets, since it is very difficult or impossible to mechanically rework these after assembly. When the sliding guide shoe travels over a rail joint, there is an impact on the car or the counterweight in each case.

DE 203 15 915 U1, for example, discloses a sliding guide shoe having a guide shoe housing and a two-part insert inserted into the guide shoe housing. In order for the insert to be inserted into the guide shoe housing, the insert has truncated-cylindrical pins which engage in bores in the guide shoe housing and thus positionally secure the insert.

SUMMARY

It is an object of the present invention to avoid the disadvantages of the known sliding guide shoes and in particular to provide a sliding guide shoe of the type mentioned at the outset with the help of which the travel comfort can be improved.

This object is achieved according to the invention by the sliding guide shoe having the features described below. The sliding guide shoe for an elevator for transporting people or goods essentially comprises the following two components: a guide shoe housing and an insert for guiding an elevator car or a counterweight. The guide shoe housing is used for holding the insert and for being connected to the elevator car or to the counterweight. In order to be connected to the elevator car or the counterweight or to a console as an intermediate link, the guide shoe housing has, for example, openings through which fastening screws can be passed, with which the guide shoe housing can be screwed to the car or to the counterweight.

The guide shoe housing can comprise a channel-like receptacle in which the insert, which is designed as a U-shaped profile in cross-section, at least in the inserted state, is or can be inserted. In order to form the aforementioned channel-like receptacle, the guide shoe housing can have two mutually opposing parallel side wall portions and a bottom portion which connects the side wall portions. The bottom portion and the side wall portions which project away from the bottom portion at right angles form a "U" in section. The guide shoe housing can thus be formed by a U-shaped profile. However, the guide shoe housing can also have other shapes. However, for the guide shoe housing it is also possible to use the common shape known, for example, from DE 203 15 915 U1, which has a planar housing base and the two side wall portions which project approximately centrally from the housing base and form a groove for forming the channel-like receptacle.

The guide shoe housing can be made of a metal material (e.g. steel). It is also conceivable to produce the guide shoe housing from a high-strength plastics material, for example PE, PP, PA, PS, PES, POM, PEEK, TPEs, or fiber-reinforced plastics material.

The insert, which is or can be inserted into the guide shoe housing, is used to guide the elevator car along a guide rail which extends in the travel or longitudinal direction or to guide the counterweight along a guide rail which extends in the travel or longitudinal direction. The guide shoe housing has at least one bore for positionally securing the inserted insert. The insert has at least one pin which corresponds to the bore, engages in the bore, or is accommodated therein in a form-fitting manner. A bore is understood here as a round or possibly non-round recess or through-opening in the guide shoe housing. The bore does not necessarily have to be created by drilling or any other machining process. The bore could also be created, for example, during casting or some other primary forming process when producing the guide shoe housing.

The at least one bore can preferably be provided or attached to one and particularly preferably to each side wall portion. The insert can thus preferably have at least two pins, each pin being form-fittingly accommodated or able to be accommodated in a relevant bore of a side wall portion.

Because a profiled pin is provided as the pin for effecting a buffer function, the undesired vibrations described at the outset can be efficiently absorbed, which has a positive effect on travel comfort. The insert can continue to be produced easily and inexpensively. A further advantage is that the effort involved in assembling and disassembling the new type of insert with respect to the guide shoe housing remains small, even in comparison with conventional inserts. Existing sliding guide shoes can also be easily retrofitted, since only the previous insert must be replaced with the new insert having the profiled pins.

The insert is preferably designed in multiple parts, the multi-part insert comprising a sliding element provided for sliding contact with the guide rail, and a damping element. The profiling of the profiled pin is associated with the damping element. The sliding element is the element which is used for actually guiding the elevator car or the counterweight along the guide rail. For this purpose, the sliding element can have sliding surfaces or regions which, when the sliding guide shoe is installed in the elevator and is ready for use, slide along the guide rail with little play when the car is traveling. In order to optimize travel comfort, it is advantageous if the aforementioned damping element is arranged between the guide shoe housing and the sliding element. For example, a resilient plastics material, in particular a thermoplastic elastomer (TPE) or a plastics material made from cross-linked elastomers, can be used for the damping element. The damping element can be made, for example, of SBR, TUR, EPDM, NBR, NR. The damping element already has damping properties due to the appropriate choice of material, which promotes low-vibration and low-noise car travel. However, the particularly good isolation results that have now been achieved are mainly due to the profiling of the pin.

The sliding element can preferably be made of a plastics material which is characterized by a low coefficient of friction with regard to the sliding function. In addition to good sliding properties, the plastics material for the sliding element should preferably also have sufficiently high strength, rigidity, and hardness. The sliding element can be made, for example, of POM or UHMW-PE. For a safe and trouble-free operation of the elevator, the guide rails are usually wetted with oil or another lubricant. When using sliding guide shoes with sliding elements made of POM or UHMW-PE, thanks to the good dry-running properties of these plastics materials, lubricating the guide rails could even be dispensed with if necessary, or in special situations the guide rails could at least temporarily do without lubrication. Sliding elements having particularly good sliding properties also ensure jerk-free starting of the elevator car and almost noise-free running when the car is traveling.

The at least one pin can have a profiled outer contour created by indentations and/or elevations. In the contact region with the guide shoe housing, the pin has an advantageously increased local elasticity. The vibration isolation achieved thanks to the pin profiled in such a manner has a positive effect on the travel comfort when the car is traveling.

In a preferred embodiment, the at least one pin has a star-shaped cross-section for forming the profiling. Surprisingly, the star-shaped geometry of the pin construction proved to be particularly well suited to preventing structure-borne noise from the insert on the guide shoe housing.

Depending on the depth or height and the shape of the indentations or elevations of the profiling of the pin, different buffer and isolation properties can be achieved for the sliding guide shoe. For example, it is conceivable that the at least one pin has knurling on its lateral surface for forming the profiling. Instead of punctiform elevations, elongate elevations can also be advantageous.

The pin can extend in an axial direction in each case. It can be particularly advantageous for vibration isolation if the profiling of the pin also extends in the axial direction. In this way, the star-shaped buffer described above can be formed in the pin. The profiling of the pin can have a straight or helical course, for example.

In order to form the profiling, the at least one pin can have radially outwardly directed ribs or projections which are preferably distributed evenly over the circumference. Instead of ribs or projections that are created by comparatively thick-walled elevations, it would also be conceivable for the profiling to have a lamellar structure.

In order to create an advantageous structure-borne noise bridge from the insert to the guide shoe housing, the ribs or projections can each have a trapezoidal shape in cross-section. The cross-sectional shape for the ribs or projections can preferably be a substantially isosceles trapezium. The long base side of the trapezium can be arranged on the inside in the radial direction and the short base side can be arranged on the outside. The ribs or projections could also be rectangular or triangular or other shapes in cross-section.

The ribs or projections can each have two mutually opposing side flank portions and head portions which connect the two side flanks to one another, the side flank portions being straight in cross-section, but possibly also convex or even concave.

The ribs or projections can each be designed so as to be arched radially toward the outside in cross-section. Thus, the aforementioned head portions can have an arched shape in cross-section. The arched shape ensures that the pin fits optimally into the bore of the guide shoe housing.

The at least one pin can be chamfered or rounded in the region of its front edge so that it can be easily inserted into a bore of the guide shoe housing.

The at least one pin can be designed so as to be substantially hollow-cylindrical or tubular. For example, the profiling for the pin could be created by a substantially hollow-cylindrical or tubular component, for example by an annular, externally profiled, separate buffer element.

In a preferred embodiment, the sliding guide shoe comprises a two-part insert. The two-part insert consists of a sliding element and a damping element. Both the damping element and the sliding element can be produced using injection molding processes. However, other production processes such as machining processes are also conceivable.

In order to form the at least one pin, the damping element can have an annular buffer element, on the outside of which the profiling is provided and on the inside of which a hole is provided. The sliding element can correspondingly have a retainer cam, preferably designed as a solid cylinder, which is accommodated or can be accommodated in the hole. Such a sliding guide shoe is characterized by an optimal combination of sliding and vibration isolation properties. The buffer element can preferably be an integral component of the damping element and form a one-piece component therewith. The ring-shaped buffer element can be formed on a U-shaped profile body and monolithically connected thereto.

DESCRIPTION OF THE DRAWINGS

Additional advantages and individual features of the invention can be derived from the following description of an embodiment and from the drawings. In the drawings.

DETAILED DESCRIPTION

Figure 1:
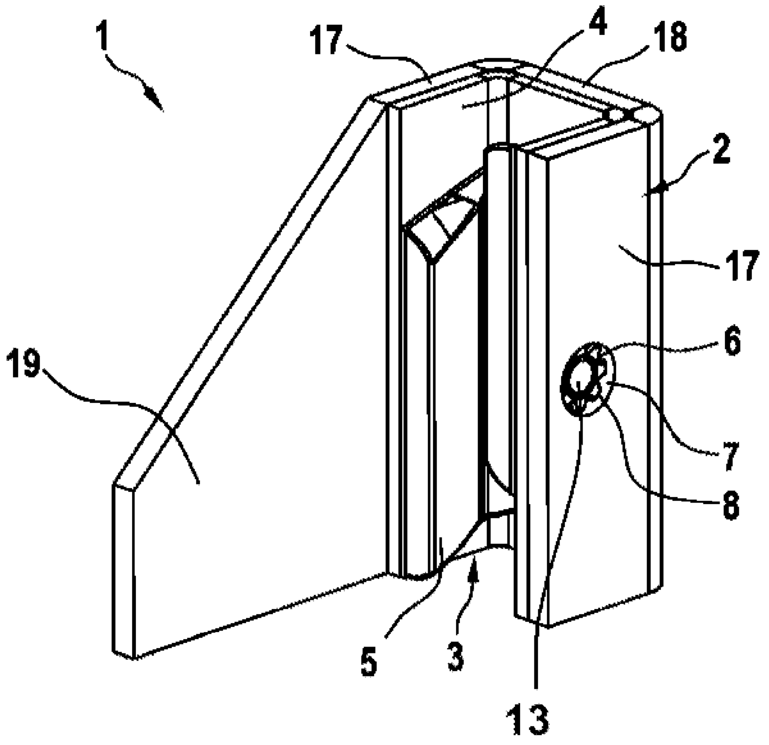
FIG. 1 is a perspective view of a sliding guide shoe according to the invention.

FIG. 1 shows a sliding guide shoe denoted by 1 for an elevator (not shown here) for transporting people or goods. The elevator can be an elevator car which is vertically guided in an elevator shaft so that it can move up and down between two guide rails (not shown) as linear guides. At least the sliding guide shoe, described in detail below, for guiding the elevator car can be arranged on each side of the elevator car. For optimal guidance, elevator cars usually have four (two per side) or more sliding guide shoes. Likewise, a counterweight (also not shown), which is connected to the elevator car via suspension means in the form of cables or belts, can have these sliding guide shoes for guiding the counterweight on counterweight guide rails.

The sliding guide shoe associated with the elevator car or the counterweight can have a groove for guiding, which surrounds a blade of a guide rail associated with the elevator shaft. This blade can be an extension of a profile. The guide rail can be formed by a T-profile. The T-profile can be, for example, a solid steel profile produced by rolling. The guide rail can also consist of or have other metal materials (e.g. aluminum), production processes or profile shapes. For example, metal profiles produced by extrusion or rails bent from metal sheets can be used as guide rails.

As can be seen from FIG. 1, the sliding guide shoe 1 comprises a one-piece guide shoe housing 2 and an insert 3 inserted therein. The insert 3 is designed in two parts and has a sliding element 5 facing the guide rail as the inner insert part, and a damping element 4 as the outer insert part. The sliding element has sliding surfaces or regions which slide along the guide rail with little play when the car is traveling. The sliding element 5 is designed to be stiff compared to the damping element 4. For example, it is made of a plastics material characterized by a low coefficient of friction such as PTFE, UHMW-PE. A material with a low stick-slip tendency is preferred, i.e. a small or minimal difference between sliding and static friction. Such sliding elements could also be used as guide rails in the case of little-oiled or unoiled rails and in particular sheet metal rails.

For example, a resilient plastics material, in particular a thermoplastic elastomer (TPE) or a plastics material made from cross-linked elastomers, can be used for the damping element 4. The damping element 4 can be made, for example, of SBR, TUR, TPU, EPDM, NBR, NR. It is also conceivable to use foamed damping elements. Advantageously, materials are to be preferred for the damping element 4 which are stable against rail oil.

The guide shoe housing 2, the channel-like receptacle, which forms the previously mentioned groove, of which housing the insert 3 is inserted, is connected to the elevator car or the counterweight. In the present embodiment according to FIG. 1, the guide shoe housing 2 is designed as a comparatively simple U-shaped metal profile in cross-section.

The guide shoe housing 2 has two mutually opposing parallel side wall portions 17 and a bottom portion 18 which connects the side wall portions. The bottom portion 18 and the side wall portions 17 which project away from the bottom portion at right angles form a "U", as can be seen in section. In the embodiment according to FIG. 1 it is further illustrated by way of indication and example that one of the side wall portions 17 is lengthened to form a fastening region 19 with regard to the connection to the elevator car or to the counterweight. However, instead of the simple U-profile shape, the guide shoe housing could also have other shapes; for example housing shapes such as those known and familiar to a person skilled in the art from DE 203 15 915 U1, for example.

In order to positionally secure the insert 3, the guide shoe housing 2 has two mutually opposing bores 7 which are arranged in the parallel side wall portions 17 of the guide shoe housing, in which bores each a pin 6 engages. The pin 6 consists of an annular buffer element 8 associated with the damping element 4 and a retainer cam 13 associated with the sliding element 5, the retaining cam 13 being accommodated in the hole of the buffer element 8 denoted by 12 in FIG. 2. The buffer element 8 of the pin 6 has a profiled outer contour that is created by elevations and forms a star polygon in cross-section. The vibration isolation achieved with this profiled pin 6 can meet high demands with regard to travel comfort in a simple and cost-effective way. The profiled pin 6 described below in detail is not only advantageous for the two-part inserts for sliding guide shoes. A pin 6 profiled in this way or similarly could also be used for sliding guide shoes having one-piece inserts, i.e. inserts that consist only of the sliding element and manage without a damping element. In this case the sliding element would be equipped with the profiled pins.

Figure 2:
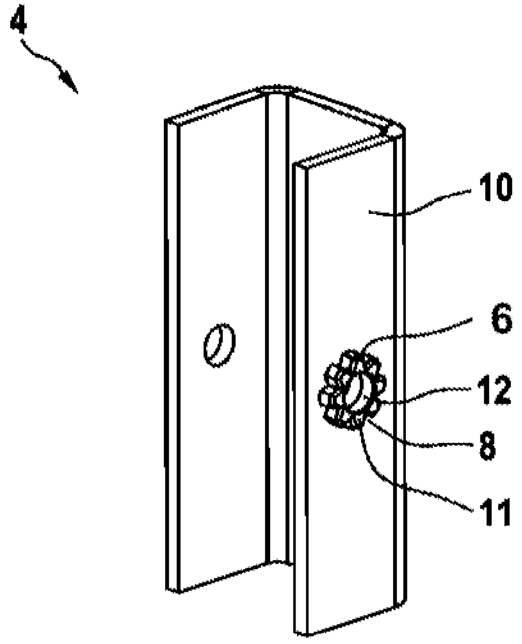
FIG. 2 shows a damping element of the sliding guide shoe according to FIG. 1 in an enlarged perspective view.

It can be seen from FIG. 2 that the damping element 4 has a U-shaped profile body 10. The damping element 4 can, for example, be an injection molded part.

Two buffer elements 8 are formed on the profile body 10 and form a one-piece, monolithic component therewith. The relevant pin 6 has a star-shaped cross-section for forming the profiling. The profiling of the pin 6, which extends in an axial direction, has radially outwardly directed projections 11 which are distributed evenly over the circumference. The projections 11 extend in the axial direction. Instead of the straight course shown in the embodiment, the projections 11 and thus the profiling could also have a helical course. The pins 6 are chamfered so that they can be easily inserted into the bores 7 in the region of its front edge.

Figure 3:
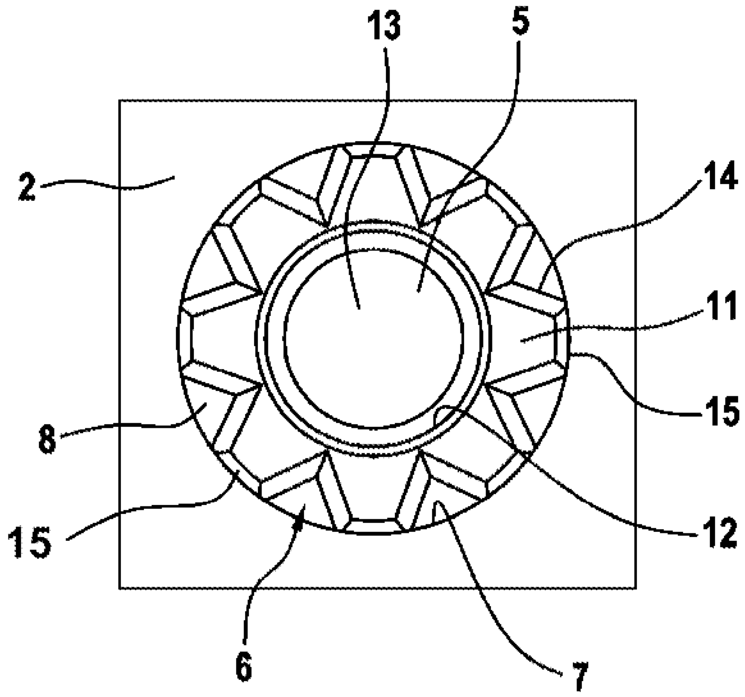
FIG. 3 is a top view of a pin of an insert of the sliding guide shoe accommodated in a bore of a sliding guide shoe housing according to FIG. 1 in a greatly enlarged partial view.

More details on the design of the pin 6 of the insert can be seen in FIG. 3. From this it can be clearly seen that the projections 11 of the star-shaped buffer each have a trapezoidal shape in cross-section. As can be seen, the trapezoid in the present case is an isosceles trapezoid. The projections 11 each have two mutually opposing side flank portions 14 and the two side flanks 14 have interconnecting head portions 15 which define the short base sides of the trapezoids. However, the head portions 15 are not designed to be straight in cross-section, but instead have a complementary arched shape so that they can be favorably accommodated in the round bore 7 in a form-fitting manner. The retainer cam 13 of the sliding element 5 is designed here as a solid cylinder.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A sliding guide shoe for an elevator to guide an elevator car or a counterweight, the sliding guide shoe having a guide shoe housing and an insert inserted into the guide shoe housing, the sliding guide shoe comprising:

a bore formed in the guide shoe housing for positionally securing the insert; and the insert having a pin engaged in the bore, wherein the pin includes profiling in the form of a non-circular outer profile which is uniform in cross-section extending in an axial direction of the pin, the cross-section forming a star-shaped star polygon and the profiling being form-fitted in the bore.

2. The sliding guide shoe according to claim 1 wherein the insert has multiple parts including a sliding element for sliding contact with a guide rail of the elevator and a damping element, the pin having a buffer element associated with the damping element.

3. The sliding guide shoe according to claim 2 wherein the buffer element has the profiled outer contour.

4. The sliding guide shoe according to claim 1 wherein the pin has the profiled outer contour formed by indentations or elevations.

5. The sliding guide shoe according to claim 1 wherein the profiling is formed by radially outwardly directed ribs or projections which are distributed evenly over a circumference of the pin.

6. The sliding guide shoe according to claim 5 wherein the ribs or the projections each have a trapezoidal shape in cross-section.

7. The sliding guide shoe according to claim 5 wherein the ribs or the projections are arched radially at an outer circumference of the pin.

8. The sliding guide shoe according to claim 1 wherein the pin is chamfered or rounded in a region of a front edge such that the pin can be easily inserted into the bore of the guide shoe housing.

9. The sliding guide shoe according to claim 1 wherein the pin is tubular.

10. The sliding guide shoe according to claim 1 wherein the insert is a two-part insert having a sliding element and a damping element, wherein the pin is formed by an annular buffer element on the damping element and a retainer cam, the buffer element having the profiling on an outside and a hole on an inside, and the sliding element having the retainer cam that is accommodated in the hole.

11. A sliding guide shoe for an elevator to guide an elevator car or a counterweight, the sliding guide shoe having a guide shoe housing and an insert inserted into the guide shoe housing, the sliding guide shoe comprising:

two bores formed in the guide shoe housing for positionally securing the insert; and the insert having two pins, each of the pins engaging in an associated one of the bores, wherein each of the pins includes profiling, where the profiling is formed by radially outwardly directed ribs or projections which are distributed evenly over a circumference of the pin forming a star-shaped star polygon cross-section and which are continuous along an axial direction of the pin, and where the ribs or the projections are arched radially at an outer circumference of the pin and form-fitted in the bore.

12. A sliding guide shoe for an elevator to guide an elevator car or a counterweight, the sliding guide shoe having a guide shoe housing and an insert inserted into the guide shoe housing, where the insert is a two-part insert having a sliding element and a damping element, the sliding guide shoe comprising:

a bore formed in the guide shoe housing for positionally securing the insert;

the insert having a pin engaged in the bore, wherein the pin is formed by an annular buffer element on the damping element and a retainer cam, the buffer element having profiling on an outside and a hole on an inside, and the sliding element having the retainer cam that is accommodated in the hole; and wherein the buffer element has a profiled outer contour including pre-formed indentations or elevations forming a star-shaped star polygon cross-section and being form-fitted in the bore.

13. The sliding guide shoe according to claim 12 wherein the profiled outer contour of the pin is formed by the indentations or the elevations extending in an axial direction of the pin.

* * * * *